INVENTOR.
FRANCIS P. KEIPER, JR.

Feb. 20, 1962   F. P. KEIPER, JR   3,022,462
FREQUENCY MODULATION DETECTOR SYSTEM
Filed Jan. 19, 1953   3 Sheets-Sheet 3

INVENTOR.
FRANCIS P. KEIPER, JR.
BY
ATTORNEY

United States Patent Office 3,022,462
Patented Feb. 20, 1962

3,022,462
FREQUENCY MODULATION DETECTOR SYSTEM
Francis P. Keiper, Jr., Elkins Park, Pa., assignor, by mesne assignments, to Philco Corporation, Philadelphia, Pa., a corporation of Delaware
Filed Jan. 19, 1953, Ser. No. 331,782
14 Claims. (Cl. 329—126)

This invention relates to electrical systems and, more particularly, to improved detector systems for frequency-modulated waves.

The invention is particularly adapted for use in F-M detector systems in which the output signal is in the form of amplitude variations about a reference level other than zero, and in which the value of the reference level is to be held constant regardless of changes in the magnitude of the amplitude variations. F-M detectors of the foregoing type find especial use in cathode-ray tube display devices wherein a detected signal, having an assigned reference level component and having an amplitude-varying component of very low, or even zero, frequency value, is to be applied to an electrode system of the cathode-ray tube.

In order to avoid the need for inordinately large coupling capacitors or especially designed transformers, such as would be needed to supply both of the signal components to the display device, it has been the practice, in systems of the aforementioned type, to apply the composite signal directly to the electrode system of the cathode-ray tube. It is frequently desirable, in such applications, to be able to increase the magnitude of the amplitude-varying component of the applied signal without changing the magnitude of the reference-level component thereof. Thus, when the applied signal serves to intensity-modulate the cathode-ray beam, it may be desirable to increase the magnitude of the amplitude-varying component of the signal in order to increase the range of brightness of the image produced upon the screen of the cathode-ray tube, without however, shifting the value of the bias voltage impressed upon the intensity control grid thereof and thereby changing the average value of the brightness. Similarly, when the signal is used for deflecting the cathode-ray beam, it may be desirable to increase the deflection excursions without affecting the resting point of the beam.

A specific need for a system capable of adjusting the magnitude of the amplitude variations of a signal without affecting the magnitude of the reference-level component of the signal is found, for example, in a telemetering system forming part of a sonobuoy system. In such a telemetering system, an energizing signal, as derived from an F-M detector, serves to indicate, on an appropriate cathode-ray tube display, the magnetic bearing of the line of maximum receptivity of a sensing element rigidly mounted on the sonobuoy. In one such system, the magnetic bearing information may be transmitted by means of first and second subcarrier waves, each frequency-modulated in accordance with the bearing information, so that one subcarrier wave is indicative of the angle made by the aforesaid line with respect to magnetic north, while the other subcarrier wave is indicative of the value of an angle differing by 90 degrees from the first-named angle. Because of the slow azimuthal rotation of the sonobuoy, for example of the order of 3 r.p.m., the rate at which the subcarrier waves are frequency modulated is generally very low, and in the above specific instance is of the order of 0.05 cycle per second. The subcarrier waves so frequency-modulated may then be applied as modulation signals to a main carrier wave which is subsequently radiated to the receiving position by a radio transmitter of conventional form.

At the receiving position, the two subcarrier waves may be recovered by a conventional detector system and are separated by suitable filtering means and applied to individual F-M detectors. The output signals so produced may then be applied respectively to the horizontal and vertical deflection means of a cathode-ray tube to produce an angular displacement of the beam corresponding to the contemporaraneous magnetic bearing of the aforesaid line of maximum receptivity. Desirably the displacements of the beam produced by each of the detected signals are equal and have a given predetermined magnitude, so that a circular pattern of given radius and center position is formed on the cathode-ray tube display screen.

In practice, however, this situation is not realized, so that, at the receiver location, it is necessary to vary the amplitude of one of the signals with respect to the other in order to avoid forming an elliptical trace. Furthermore, the magnitudes of the amplitude variations of the signals are established at the transmitter by the intensity of the horizontal component of the magnetic field existing at the location of the sonobuoy. Consequently, sonobuoys positioned in different geographical locations— and hence in areas of different magnetic intensities— will produce, for a given magnetic bearing, subcarrier waves which are frequency-modulated to different extents. Additionally, because of variations in the values of specific circuit components as found in different sonobuoys, there may be significant discrepancies in the frequency deviations of the subcarrier waves produced by different buoys positioned at substantially the same geographical location. Accordingly, at the receiving position, the magnitudes of the amplitude-varying components of the detected signals, as derived from the different sonobuoys, will vary in a manner corresponding to these discrepancies. In order to correlate properly the information derived from the various sonobuoys, however, it is necessary that the display produced by each buoy be a circle of given radius and given center position. Consequently, means for adjusting the absolute magnitudes of the amplitude-varying components of both signals must be provided at the receiving position.

Because of the extremely low frequency value of the amplitude variations of the detected signals, i.e. of the order of 0.05 cycle per second as above pointed out, it has been necessary to utilize for this purpose direct-coupled amplifiers interconnecting the detectors and the display device. However, such direct-coupled amplifiers normally modify the reference-levels of the signals as well as the magnitudes of the amplitude-varying components thereof. Thus it is found that, when the amplitude variations of the signals are altered in extent to produce a circular pattern, a shift of the center of the circular trace is also produced by reason of the concomitant change in the reference level of the signals.

Accordingly, it is an object of the invention to provide an improved detector system for a frequency-modulated signal.

Another object of the invention is to provide an improved detector system for a frequency-modulated signal, which system is adapted to produce an output signal having an amplitude-varying component and a reference-level component.

A further object of the invention is to provide an improved detector system for a frequency-modulated signal, which system is adapted to produce an output signal having an amplitude-varying component of low frequency value and a reference-level component, and in which the magnitude of the amplitude-varying component is adjustable through a substantial range of values without affecting the magnitude of the reference-level component.

A specific object of the invention is to provide an improved detector system for a frequency-modulated signal, which system is adapted to produce an output signal consisting of an amplitude-varying component, as determined by the intelligence modulating the F-M signal, and a reference-level component, and in which system the magnitude of the amplitude-varying component of the said output signal may be adjusted, without affecting the value of the reference level component, to a given predetermined value irrespective of the extent of the frequency variations of the input signal to the system.

In accordance with the invention, in a receiving system adapted to produce an output signal having a given reference level and having amplitude variations about the said reference level as determined by the extent of the frequency deviations of an F-M signal applied to the receiver, the foregoing objects are achieved by converting the received F-M signal into consecutive pulses recurring at a repetition rate proportional to the instantaneous frequency value of the received signal and having an instantaneous duration proportional to the aforesaid instantaneous frequency value. The so-generated pulses are supplied to an averaging system which produces an output signal having a reference level component as determined by the average repetition rate of the pulses and the average rate thereof, and having amplitude variations about the said reference level as determined by the variations of the repetition rate of the pulses and the corresponding variations of the area of the pulses about the aforesaid average area. It is a feature of the system of the invention that the converting means for generating the said pulses is adapted to vary the duration and the amplitude of the pulses in an inverse manner such as to maintain the average area thereof at a constant value while modifying the extent of the variations of the area of the pulses.

In a preferred form the system of the invention comprises a pulse generator adapted to produce a pulse train, the individual pulses of which have a given amplitude as established by a first control potential applied to the generator, a duration as established by the frequency value of a synchronizing signal derived from the received F-M wave and by a second control potential applied to the generator, and a repetition rate as determined by the frequency value of the synchronizing signal. The system further comprises an averaging network coupled to the pulse generator, by means of which network an output wave is produced having a given reference level and amplitude variations about the said reference level as determined by the extent of the frequency deviations of the F-M signal applied to the receiver. The first and second control potentials are simultaneously variable in a sense such that the duration of the pulses may be changed in an inverse manner with respect to the amplitude of the pulses. By so varying the amplitude and duration of the pulses under the control of the said first and second potentials, the average area thereof may be maintained at a constant value so that the reference level component of the output signal derived from the pulses may similarly be held at a constant value notwithstanding these changes. At the same time, the variation of the first and second potentials modifies the extent of the variations of the area of the pulses so that the variations of the variable amplitude component of the output signal may be adjusted to a desired value.

The invention will be described in greater detail with reference to the appended drawings forming part of the specification, and in which.

Figure 1:
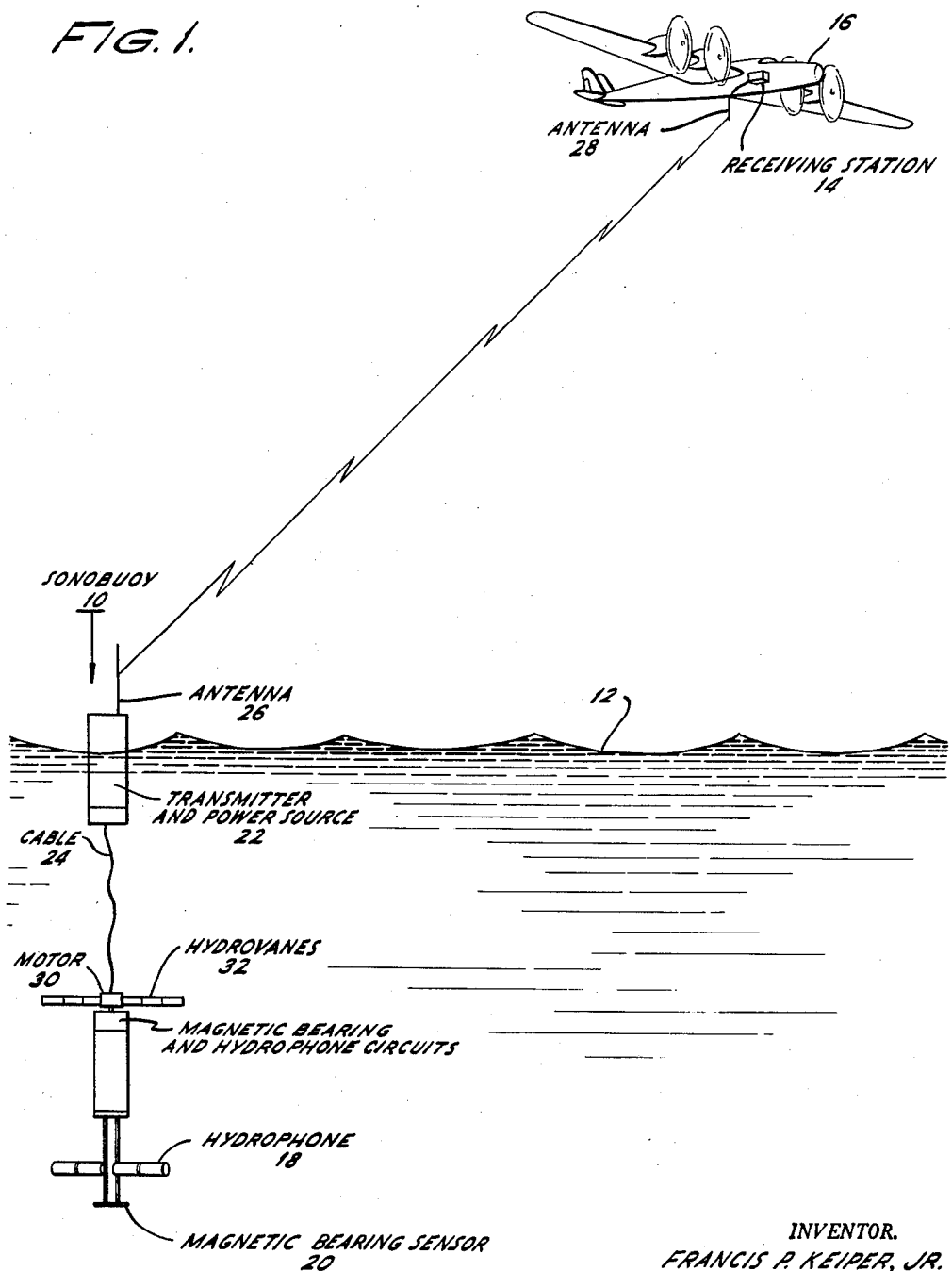
FIGURE 1 is a diagrammatic illustration of a sonobuoy system utilizing an F-M detector of the invention.

The system shown in FIGURE 1 comprises a sonobuoy 10 which is depicted as floating in a body of water 12, and a receiving station 14, which, in the present instance, may be located in an airplane 16.

The buoy 10 is equipped to relay to an observer in airplane 16 a first signal corresponding to underwater sounds detected over a given range of frequency values, for example 13 kc./s. to 17 kc./s., in which range of frequencies the churning of the propellers of a target, such as a submarine, generates a characteristic noise. The latter signals may be sensed by a hydrophone 18 of well-known form which may comprise magnetostrictive or piezoelectric transducers (not shown). The hydrophone 18 may be built to have a highly directional sensing characteristic, so that, in association with a suitable means for sensing the magnetic bearing of the direction of maximum receptivity of the hydrophone 18, the sonobuoy 10 may apprise the observer in airplane 16 not only of the nature of the detected sound but also of its magnetic bearing.

For establishing the magnetic bearing of the direction of maximum receptivity of the hydrophone 18, there is provided a magnetic bearing sensor 20, which is rigidly mounted with respect to the hydrophone 18, and which produces sensing signals which are combined, as described hereinafter, with the signals from the hydrophone 18 and applied as a modulating signal to a radio transmitter 22 by means of an interconnecting cable 24. The radio transmitter 22 radiates its carrier wave by means of antenna 26, which wave is detected by an antenna 28 located in the airplane 16 and is demodulated and displayed and, in the case of the hydrophone signal, made audible by the receiving station 14.

In order that the hydrophone 18 shall be enabled to search the entire neighborhood of the sonobuoy 10, a motor 30 and hydrovanes 32 are provided, which are adapted to rotate the hydrophone and the magnetic bearing sensor portion of the buoy 10 at a relatively slow rate, e.g. 3 r.p.m.

Figure 2:
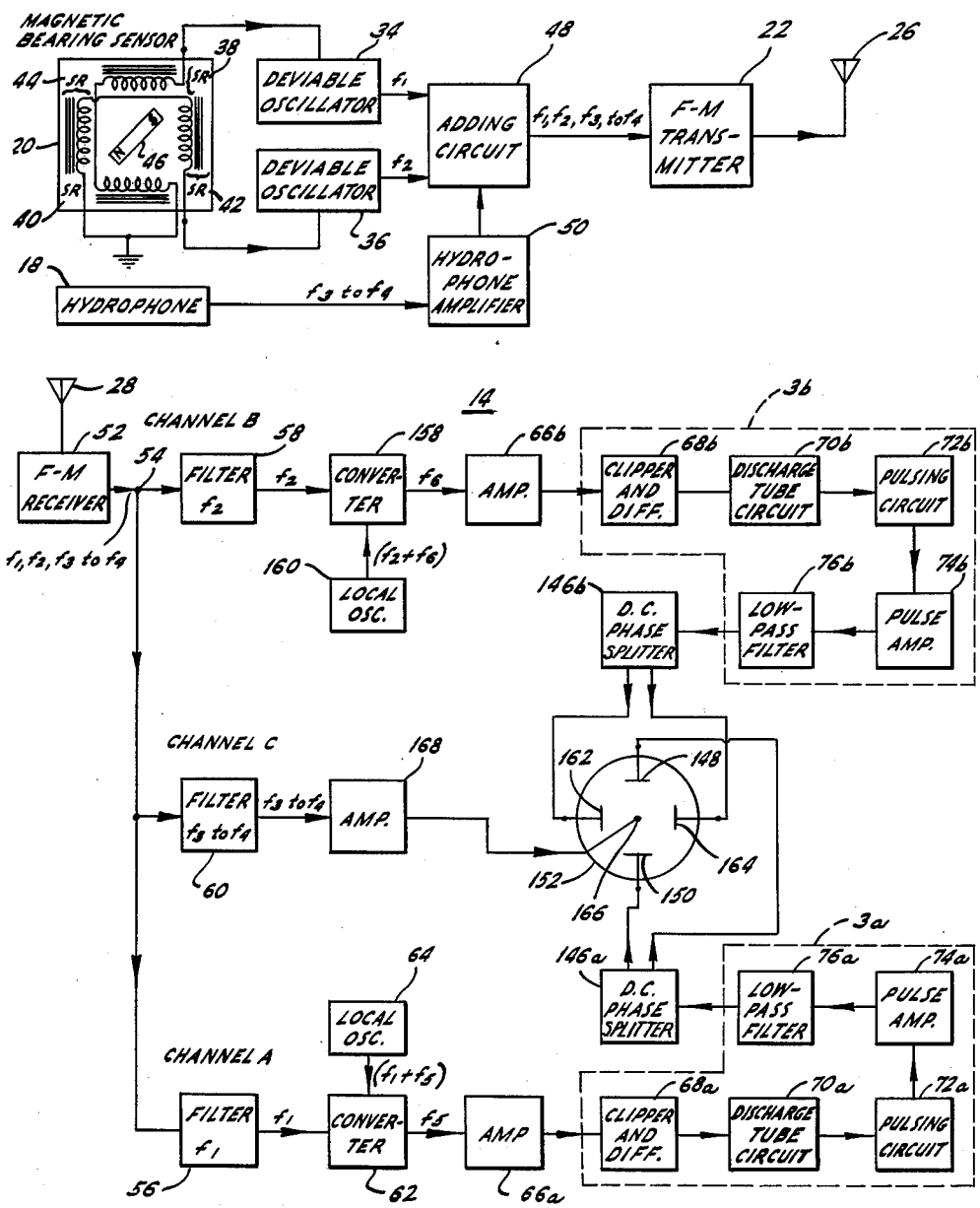
FIGURE 2 is a block diagram of the telemetering system of the sonobuoy system of FIGURE 1 embodying an F-M detector of the invention.

The telemetering system outlined above and embodying the invention is shown in greater detail in FIGURE 2. As shown in this figure, the system for generating a signal indicative of the magnetic bearing of the hydrophone 18 may comprise the magnetic bearing sensor 20 which embodies four substantially identical saturable reactors 38, 40, 42 and 44, arranged symmetrically along the sides of a square in balanced relationship. The paired reactors 38 and 40 are coupled in series-opposing relationship to a deviable oscillator 34 having a nominal frequency $f_1$, and the paired reactors 42 and 44 are similarly coupled to a deviable oscillator 36 having a nominal frequency $f_2$, thereby to form a first pair of reactors 38 and 40 hereinafter referred to as north-south reactors, and a second pair of reactors 42 and 44 hereinafter referred to as east-west reactors. Each of the saturable reactors 38, 40, 42 and 44 may be in the form of a solenoid wound on a cylindrical ferromagnetic core (not shown). The sensor 20 may additionally comprise a permanent bar magnet 46 centrally placed along a diagonal of the square defined by the four reactors and serving to provide an initial magnetic bias for the system.

The magnetic bearing sensor 20 operates on the well-known principle that the inductance of a saturable reactor can be varied by applying an external magnetic field thereto. Accordingly, as the sonobuoy rotates in the earth's magnetic field, the reactors of the sensor will undergo changes in inductance values, as determined by the magnetic heading of the sonobuoy, about an initial value established by the initial magnetic bias.

The variations of the inductance values of the reactors of sensor 20 are utilized to produce corresponding frequency variations of the respective oscillators 34 and 36. For this purpose, each of the oscillators may comprise a frequency-determining network constituted in part by the respective inductance pairs, and an electron discharge tube (not shown) coupled in feedback relationship to the frequency-determining network. The nominal frequency of each of the oscillators will be determined by the constants of the network for that magnetic bearing of the respective inductors at which the external magnetic field has no influence on the inductance of the reactors—i.e., for that bearing at which the respective reactor pairs are at right angles to the external magnetic field.

In the system of the invention shown in FIGURE 2, oscillator 34 may have a nominal frequency $f_1$ of 4700 c.p.s. and may be frequency-deviated, in a typical case, through a maximum range of plus or minus 40 c.p.s. by the maximum variations in the inductance of the north-south reactors 38 and 40. Oscillator 36, in general, is constructed with a nominal frequency value $f_2$ which differs substantially from $f_1$, and may, in the present case, have a value of 5700 c.p.s. The frequency value of oscillator 36 may similarly undergo deviations of the order of plus or minus 40 c.p.s. as established by the variations in inductance of the east-west coils 42 and 44. Since the sonobuoy 10 (see FIGURE 1) rotates at a relatively slow speed, for example 3 r.p.m., the oscillators 34 and 36 are accordingly each frequency-modulated at a correspondingly low rate of 0.05 c.p.s., the instantaneous frequency of the oscillators being indicative of the magnetic bearing of the sonobuoy. As a rule the magnetic field external to the sonobuoy will be substantially uniform so that the frequency deviations of the oscillators are substantially sinusoidal. Because of the space-quadrature relationship of the respective reactor pairs, the sinusoidal variations of the frequency value of oscillator 34 will differ in phase by 90° from the sinusoidal variations of the frequency value of oscillator 36, and, in the following discussion, the former sinusoidal variations will be assumed to lead the latter by 90 degrees.

The two signals produced by oscillators 34 and 36 are combined by an adding circuit 48 to which there is also applied the information signal from the hydrophone 18, the latter signal being previously amplified by an amplifier 50 having a pass band between $f_3$ and $f_4$ which excludes the frequencies $f_1$ and $f_2$ characterizing the oscillators 34 and 36, and which is centered about the frequencies of the signals characterizing the target information—i.e. signals between 13 kc./s. and 17 kc./s., which are most characteristic of the noises produced by targets such as submarines.

The composite output signal of adding circuit 48 is transmitted to the receiving location by means of an F-M transmitter 22 to which the output signal is applied as a modulation signal.

At the receiving position there may be provided an F-M receiver 52 of conventional form, at the output of which is produced an output signal having substantially the same form as the composite signal at the output of adding circuit 48. The magnetic bearing information signals, of nominal frequencies $f_1$ and $f_2$ respectively, are derived from the output signal at junction 54 by means of filters 56 and 58 respectively coupled thereto, while the hydrophone signal having a passband from $f_3$ to $f_4$ is derived by a filter 60. Thus the north-south magnetic bearing signal is found at the output of filter 56, in channel A; the east-west magnetic bearing signal is found at the output of filter 58, in channel B; and the hydrophone information signal is found at the output of filter 60, in channel C. (For greater clarity, the same numerals, suffixed with either an $a$ or a $b$, are applied in FIGURE 2 of the drawing to components having substantially identical structure and present in channels A and B, respectively.) The output of filter 56 of channel A is coupled to a frequency converter 62 to which there is additionally coupled a local oscillator 64 having an output frequency $(f_1+f_5)$. These elements serve to convert the nominal frequency value $f_1$ of the applied signal to a new nominal value $f_5$ which, in the case of a signal having a frequency $f_1$ of 4700 c.p.s. as previously given, may have a nominal frequency value of 700 c.p.s. By means of this frequency conversion, the deviation ratio of the F-M signal in channel A is increased. Converter 62 and local oscillator 64 are of conventional form and may comprise a common pentagrid converter electron discharge tube and associated circuitry in accordance with well established practice.

The output from converter 62 is supplied to a linear amplifier 66a of conventional design, and thereafter to an F-M detector 3a which is of the pulse-counter type and which comprises a clipper and differentiator 68a, a discharge tube circuit 70a, a pulsing circuit 72a, a pulse amplifier 74a and a low-pass filter 76a. The output signal from filter 76a is supplied to a D.-C. phase splitter 146a, energizing the deflection plates 148 and 150 of a cathode-ray tube 152, thereby to deflect the cathode-ray beam thereof in accordance with the intelligence contained in the output signal of D.-C. phase inverter 146a, which intelligence is indicative of the magnetic bearing of the direction of maximum receptivity of the hydrophone 18.

Figure 3:
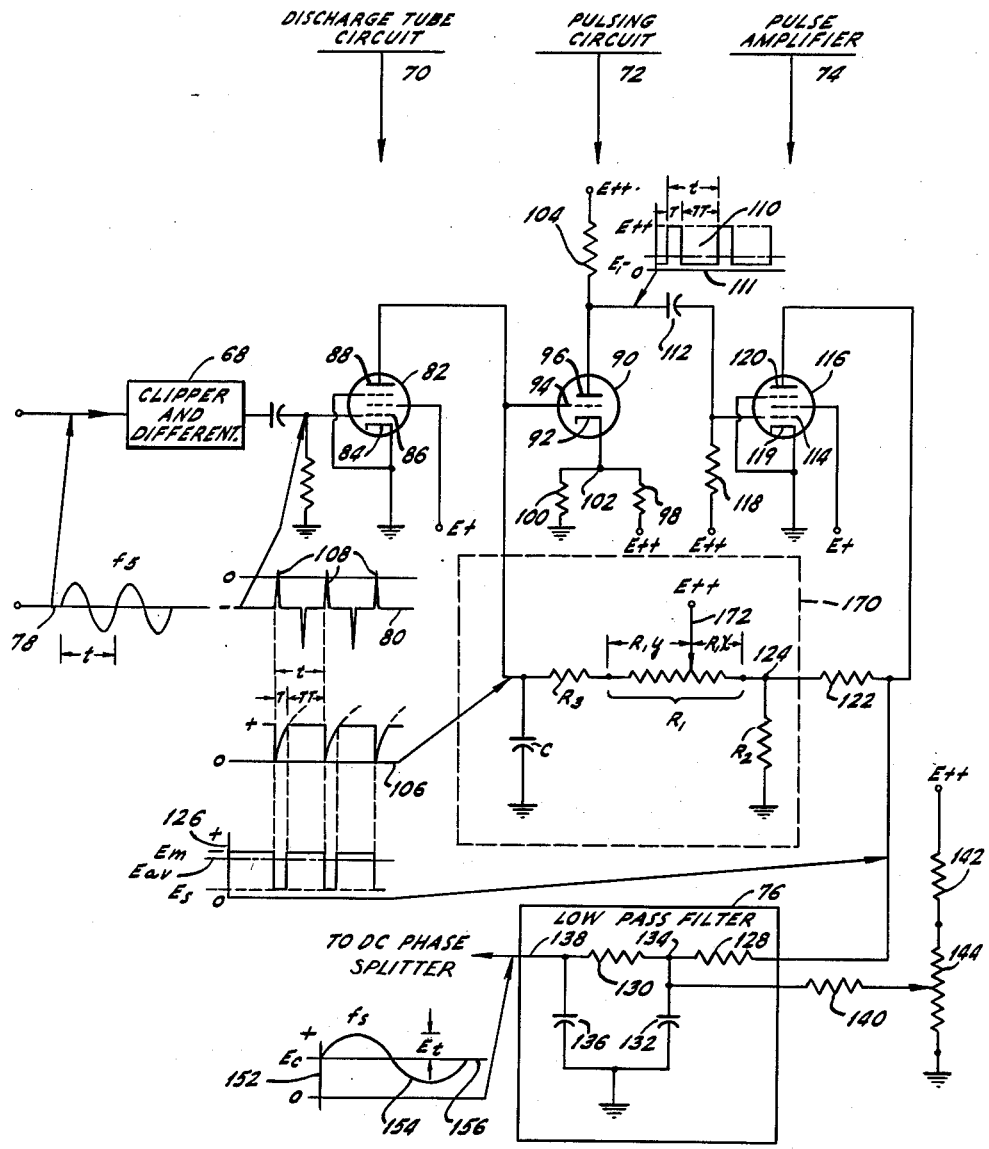
FIGURE 3 is a schematic diagram of one form of an F-M detector according to the invention as utilized in the system of FIGURE 2.

The detector 3a is shown in greater detail in FIGURE 3. As shown in this figure, the input circuit of the detector consists of the input clipper and differentiator 68. The latter circuit is of conventional form and may comprise a cathode-coupled clipper type circuit (not shown) which converts a sinusoidal wave applied thereto into a rectangular wave, and in turn applies the rectangular wave to an inductive load (not shown) serving to differentiate the rectangular wave thereby to produce a pulsatile waveform.

The discharge tube circuit 70, coupled to the clipper and differentiator 68, comprises a discharge tube 82 having a cathode 84, a control grid 86 and an anode 88. The cathode 84 is operated at ground potential, whereas the operating bias for the tube 82 is supplied by a resistor in the grid circuit thereof. The anode 88 is supplied with a positive potential from a source E++ through a resistor $R_3$ and the included portion $R_{1y}$ of the resistance of the potentiometer $R_1$. The anode circuit of the tube 82 also includes a capacitor C which is connected between the anode 88 and a point at ground potential.

The pulsing circuit 72 comprises a tube 90 having a cathode 92, a control grid 94 and an anode 96. Tube 90 is operated at a predetermined bias level by means of a resistive voltage divider system 98 and 100 which shunts the source E++, and to the junction 102 of which the cathode 92 is connected. The control grid 94 is directly coupled to the anode 88 of tube 82, while the anode 96 of tube 90 is coupled to the source E++ by means of a load resistor 104.

The pulse amplifier 74 comprises a tube 116 having a cathode 119, a control grid 114 and an anode 120. Cathode 119 is connected to a point at ground potential, while control grid 114 is coupled to the source E++ by means of a resistor 118 having a high ohmic value, and to the anode 96 of tube 90 by a capacitor 112. Anode 120 is energized from the source E++, being coupled thereto by a resistor 122 connected in series relationship with the included portion $R_{1x}$ of the resistance of potentiometer $R_1$. A resistor $R_2$ serves to couple the interconnection 124 of the resistor 122 and the potentiometer $R_1$ to a point at ground potential.

The low-pass filter 76 comprises resistors 128 and 130 connected in series relationship, a capacitor 132 coupling junction 134 of resistors 128 and 130 to a point at ground potential, and a capacitor 136 coupling junction 138 at the output of resistor 130 to a point at ground potential. The filter 76 is coupled to the anode 120 of tube 116 by means of the resistor 128. In addition, a D.-C. biasing potential is applied to junction 134 of filter 76. This potential is derived by an isolating resistor 140 from a voltage dividing network which comprises a resistor 142 and a potentiometer 144 connected in series relationship between source E++ and a point at ground potential.

In operation, the F-M signal, illustrated at 78 and having a nominal frequency $f_5$ and an instantaneous period $t$, is applied to the clipper and differentiator 68. The latter circuit, in response to the input waveform, produces an output signal shown at 80 and comprising positive-going pulses 108 which recur at a repetition rate established by the interval $t$.

The pulses 108 initiate the charging period of the capacitor C. More particularly, at the end of a pulse 108—at which time the capacitor C is in a discharged condition as later to be more fully pointed out—the capacitor C begins to charge from the source E++ through the series-connected resistance elements $R_3$ and $R_{1y}$. The charging waveform during the interval T is shown at curve 106. When the voltage across the capacitor C attains a predetermined value equal to the voltage at the cathode 92 of tube 90, as determined by the relative magnitudes of resistors 98 and 100 and by the value of the potential at E++, a conduction path is produced between the grid 94 and the cathode 92 which prevents further charging of the capacitor C. As a result, the potential across the capacitor C is held at a fixed level as shown by curve 106.

At the same time the anode-cathode path of the tube 90 becomes heavily conductive so that the voltage at the anode 96 thereof is reduced to a minimum value, indicated by $E_1$ in the curve 111. This anode-cathode conduction continues through the interval TT, whereby the anode voltage of tube 90 remains at the value $E_1$ until the interval TT is terminated by the appearance of a pulse 108 at the grid 86 of tube 82. At this time, the tube 82, which is normally cut off, is caused to conduct heavily by the positive-going pulse 108. This heavy conduction serves to discharge the capacitor C substantially completely. The discharging of the capacitor C causes the grid 94 to assume a voltage markedly negative with respect to the cathode 92 so that tube 92 is again cut off and the anode voltage thereof is almost instantaneously increased to the value of the E++ source. The above-described operation is repeated cyclically at an instantaneous repetition rate as determined by the instantaneous frequency of the pulses 108, and hence, by the instantaneous frequency $1/t$ of the F-M signal applied to the clipper and differentiator 68.

The rectangular pulse waveform, generated at the anode 96 of tube 90 as above described, is supplied through capacitor 112 to control grid 114 of amplifier tube 116. Since, as aforementioned, control grid 114 is coupled to the source of positive potential E++ through current-limiting resistor 118, the control grid 114 tends to operate at a potential positive with respect to cathode 119, and under these conditions, a low-impedance conduction path is established between cathode 119 and control grid 114. During the interval T, at which time a positive-going pulse is applied to capacitor 112, the grid current drawn through the low-impedance conduction path established between cathode 119 and grid 114 charges capacitor 112 to provide a negative bias potential for grid 114. At the same time, a heavy current is drawn through the anode-cathode path of tube 116 and hence through anode load resistor 122. In the preferred form of the invention, resistor 122 has a high ohmic value, and accordingly, the potential at the anode 120 of the tube is reduced to a low value during this current flow, as indicated by $E_s$ in the waveform shown at 126.

At the end of the interval T, the voltage applied to capacitor 112 falls to the value $E_1$. As a result, the negative bias potential, developed across capacitor 112 during the interval T and applied to control grid 114 of tube 116, cuts off the anode-cathode current of tube 116. The potential at anode 120 of tube 116 therefore rises to a value substantially equal to the potential of the interconnection 124, which potential is indicated by $E_m$ in the waveform shown at 126. Since the resistor 118 has a high ohmic value, the capacitor 112 retains a sufficient amount of the charge acquired during the interval T so that the bias potential at the control grid 114 remains sufficiently negative throughout the time-interval TT to maintain the anode-cathode current of tube 116 cut off. Thus the amplitude of the excursions of the pulses produced at the anode 120 varies between the values $E_s$ and $E_m$ as shown by the waveform at 126, which difference is substantially equal to $E_m$.

By means of the low-pass filter 76, the amplified waveform shown at 126 is converted into an output signal having a given reference level as shown at 156 and variations about this reference level as shown at 154. The peak displacement of the signal 154, shown as $E_t$, is determined by the peak deviation, from the nominal frequency value $f_5$, of the repetition rate of the pulses shown at 126 and produced by the detector system so far described. The value $E_c$ of the reference level 156, on the other hand, is determined by the average area of the pulses applied to the low-pass filter 76 and by the value of the voltage applied to the interconnection 134 by the isolating resistor 140.

The output signal from filter 76, shown at 152, is supplied to the D.-C. phase splitter 146a (see FIGURE 2) and energizes the deflection plates 148 and 150 of the cathode-ray tube 152. It will be seen that, in response to the signal applied to deflection plates 148 and 150, the cathode-ray beam of tube 152 will be deflected vertically, the extent of the deflection being determined by the amplitude $E_t$ of the wave 154 and the center of the deflection being determined by the value $E_c$ of the reference level component 156 as modified by the steady D.-C. voltage superimposed on the signal from the potentiometer 144. In practice the reference level 156 is caused to have a value $E_c$ such that the rest-point of the cathode-ray beam falls on the horizontal center line of the screen of tube 152.

For the reasons previously pointed out, it is desirable to adjust the amplitude $E_t$ of the wave 154 without disturbing the value $E_c$ of the reference level component 156, so that a deflection of given value may be established at the cathode-ray tube screen without affecting the rest-point of the cathode-ray beam—i.e., the center point of the deflection.

In accrdance with the invention, a change in the amplitude value $E_t$ of the output signal component 154 is produced, without changing the value $E_c$, by varying the peak amplitude $E_m$ of the pulses shown at 126 without affecting the average area of the pulses. This constancy of average area is attained by varying the duration TT of the pulses at 126 in a sense inverse to the change in the amplitude $E_m$ of the pulses.

For this purpose, means are provided for varying the voltage supplied to the anode 120 of the pulse amplifier tube 116, thereby to vary the peak-to-peak amplitude $(E_m - E_s)$ of the pulses produced at the anode 120, and means are provided for varying the rate-of-charge of the capacitor C and hence the times T and TT following the occurrence of the positive pulse 108. As aforementioned, since the value $E_s$ is small compared to $E_m$ (see waveform 126) and has a substantially constant value, the voltage $E_m$ at the anode 120 of tube 116, during the time that the tube is cut off, is substantially equal to the peak-to-peak value, i.e., the amplitude, of the pulses shown at 126.

The amplitude $E_m$, and the duration of the interval TT, of the pulses shown at 126 are varied simultaneously and in an inverse manner by variations of the position of the movable arm 172 of the potentiometer $R_1$, which arm, when displaced toward junction 124, decreases the ohmic value of the resistance element $R_{1x}$ of potentiometer $R_1$ and increases the potential at junction 124, and simultaneously increases the resistance value $(R_3+R_{1y})$ through which the capacitor C is charged from the source E++. The increase of the potential of the junction 124 correspondingly increases the value $E_m$ and hence increases the amplitude of the pulses appearing at the anode 120 of tube 116. Similarly the increase of the resistance in the charging circuit of capacitor C decreases the charging rate of this capacitor and, as a result, the charging time interval T is lengthened and the duration TT of the pulses shown at 126 is shortened.

Both the increase in the amplitude $E_m$, and the decrease in the duration TT of the pulses shown at 126, increase the magnitude $E_t$ of the amplitude-varying component 154 of the output signal shown at 152. That is, these changes both act to increase the variation in the area of the pulses shown at 126 about the average area thereof, produced in response to variations in the repetition rate of the pulses about the average repetition rate thereof. While the increase in the amplitude $E_m$ normally tends to increase the area of the pulses shown at 126, this increase is counteracted, in the system of the invention, by the decrease in the duration TT which operates to reduce the area of the pulses. Thus it is seen that the operation of potentiometer $R_1$ produces compensatory changes which maintain substantially constant the average area of the pulses shown at 126, and hence the value $E_c$ of the reference level component of the output signal shown at 152, while permitting the variation of the area of these pulses for a given variation of the pulse repetition rate to change, hence permitting the magnitude $E_t$ of the output signal 154 to change correspondingly.

When the value of the cut-off potential of the tube 90, as established by the voltage applied to the cathode 102 thereof, is substantially equal to $$\left(1 - \frac{1}{e}\right)$$

times the value of the charging voltage of the capacitor C, substantially perfect compensation may be achieved by selecting the potentiometer $R_1$, the resistors $R_2$ and $R_3$ and the capacitor C so that the values of these components satisfy the mathematical relationship:

$$(R_1 + R_2 + R_3)C = 1/f$$

In the foregoing relationship, $f$ is the value, in cycles per second, of the nominal frequency of the frequency-modulated wave shown at 78 and applied to the input terminals of the clipper and differentiator; $R_1$, $R_2$ and $R_3$ are the resistance values, expressed in ohms, of the latter three resistive elements; C is the capacitance value of the capacitor C, expressed in farads and $e$ is the Naperian base, 2.71828 . . . .

In a specific case, for a nominal frequency value $f_5$ of 700 cycles per second as above illustrated, $R_1$, $R_2$ and $R_3$ may have values of 100,000 ohms, 25,000 ohms and 100,000 ohms respectively, while capacitor C may have a value of 0.0068 microfarad.

While the pulse waveforms shown at 80, 106, 110 and 126 have all been described as having an instantaneous pulse repetition rate substantially equal to the instantaneous frequency $1/t$ of the waveform shown at 78, it will be clear to those skilled in the art that the instantaneous pulse repetition rate of any of the aforementioned pulses need merely be proportional to the instantaneous frequency, provided only that the interval T shall always be of shorter duration than the interval $t$. Similarly the voltage applied to cathode 92 of tube 90 need only have a value sufficiently less than the value of the charging voltage of the capacitor C so that the above-mentioned relationship between the intervals $t$ and $T$ is satisfied. Under these modified conditions, a constant of proportionality, multiplying the quantity $(1/f)$, is introduced into the above-noted mathematical relationship, and the value of this constant can readily be calculated, for a specific case, by those skilled in the art.

Moreover, while, in the preferred embodiment of the invention illustrated herein, the capacitor C is charged to a maximum voltage as determined by the conduction potential of the grid 94 of tube 90, it will be evident that it is not necessary to so limit the maximum charging voltage of the capacitor. Thus, since the tube 90 operates under saturation conditions, the amplitude of the pulses produced at the anode 94 thereof is determined substantially entirely by the value of the voltage at the source E++ supplying the aforesaid anode, and the duration T of the positive-going pulses shown at 111 is determined only by the time required for the capacitor C to charge to the cut-off potential of tube 90. Accordingly, if desired, a resistor may be inserted between the interconnection of anode 88 of tube 82 and grid 94 of tube 90, to limit the grid current of tube 90.

In addition, while, in the arrangement shown, the value $E_c$ of the reference level 156 may be adjusted by varying the biasing potential derived from the potentiometer 144, it is also possible to adjust the value of the reference level by adjusting the nominal frequency value $f_5$ of the input F-M wave shown at 78. This change in the nominal frequency value may be achieved by establishing the frequency of oscillator 64 (see FIGURE 2) at a value different from that shown, thereby correspondingly adjusting the nominal frequency $f_5$ to a new value which produces the desired change in the reference level 156.

The subcarrier wave, having a nominal frequency $f_2$ and present in channel B (see FIGURE 2) at the output of filter 68, is processed by circuitry which is substantially identical to that found in channel A and described above. Thus the subcarrier wave is applied to a frequency-converter 158 differing from converter 62 only in being adapted to accept signals of nominal frequency $f_2$ rather than those of nominal frequency $f_1$. A local oscillator 160 supplies a heterodyning signal, having a value $(f_2 + f_6)$, to converter 158, whereby the nominal frequency value of the subcarrier wave is reduced from $f_2$ to $f_6$, which latter frequency value may, in one form of the system, be made equal to the intermediate frequency value $f_6$ of channel A, i.e. 700 cycles per second. The amplification and demodulation of the subcarrier wave is then carried out in a manner exactly as described above. For this reason it is not considered necessary to described the operation of the system of channel B in detail. Thus the output signal from filter 76b of channel B is supplied to D.-C. phase splitter 146b, energizing the deflection plates 162 and 164 of cathode-ray tube 152, the value $E_c$ of the reference level 156 of the output signal of filter 76b having been adjusted as aforedescribed so as to position the rest-point of the cathode-ray beam along the vertical center line of the screen of cathode-ray tube 152. Since, in general, the signals applied to the mutually perpendicular deflection plates 148, 150 and 162, 164 are of the same frequency and are in quadrature, an elliptical trace will be produced upon the screen of the cathode-ray tube 152. By adjustment of the positions of the movable arms 172 of the potentiometers $R_1$ (see FIGURE 3) in each of the detectors 3, a circular trace of given radius and center position may be produced upon the screen of tube 152 (see FIGURE 2).

Cathode-ray tube 152 further comprises an axial electrode 168 which produces a radial deflection of the cathode-ray beam in response to a potential applied thereto. Accordingly the hydrophone information signal, present at the output of filter 60 in channel C, is applied to an amplifier 168 of conventional design, and the amplified signal is applied to electrode 166 of the tube 152. Consequently the circular trace, produced as aforedescribed in response to the bearing-information subcarrier waves, is radially distorted by an amount approximately proportional to the amplitude value of the hydrophone information signal. The resultant display thus indicates the bearing relative to the sonobuoy of the sought-for underwater target.

While I have described my invention by means of specific examples and in a specific embodiment, I do not wish to be limited thereto, for obvious modifications will occur to those skilled in the art without departing from the spirit and scope of my invention.

What I claim is:

1. An electrical system comprising means responsive to an input wave for generating a signal in the form of a plurality of pulses, said pulses having an average repetition rate and an average duration substantially proportional to the average frequency value of said input wave and undergoing variations of the repetition rate and of the duration substantially proportional to deviations of the frequency of said input wave about the said average value, the said pulses each having an area defined by the amplitude and duration thereof, means coupled to the said pulse generating means for producing an output wave having a reference level component at an amplitude determined by the said average pulse repetition rate and by the average area of the said pulses and having amplitude variations about the said reference level as determined by the amplitude of the said pulses and by the said variations of the said pulse repetition rate and by the variations of the duration of the said pulses, means for varying the amplitude of the said pulses thereby to vary the amplitude of the variations of the said output wave, and means for varying the duration of the said pulses in a manner inverse to the said variation of the amplitude of the said pulses.

2. An electrical system according to claim 1 wherein the said average pulse repetition rate is substantially equal to the said average frequency value of the said input wave, and wherein the said variations of the pulse repetition rate are substantially equal to the said frequency deviations of the said input wave.

3. An electrical system according to claim 1 wherein the said means for varying the amplitude of the said pulses and the said means for varying the duration of the said pulses mutually comprise means for varying the said parameters simultaneously.

4. An electrical system according to claim 1 wherein the said means for varying the duration of the said pulses comprises means for varying said duration by an amount maintaining the average area of the said pulses substantially constant whereby the amplitude of the said reference level component is maintained at a substantially constant value.

5. An electrical system according to claim 1 wherein the said means for generating a pulse signal comprises a capacitor and a first resistance element connected in series circuit arrangement, second and third resistance elements connected in series circuit arrangement, the said series circuits being connected in parallel, and means for applying a source of positive potential to the said circuits, and wherein the said means for varying the said amplitude and duration of the pulses of the said pulse signal comprises means adapted to produce an output signal having an amplitude proportional to a potential applied thereto, means for varying the value of the said resistance element by a given amount and in a given sense and for simultaneously varying the value of the said second resistance element by the said given amount and in a sense opposite to the said given sense, and means for coupling the said output signal-producing means to the interconnection of the said second and third resistance elements.

6. An electrical system according to claim 5 wherein the said pulse signal-generating means comprises means for discharging the said capacitor at a repetition rate substantially proportional to the instantaneous frequency value of the said input wave.

7. An electrical system comprising means responsive to an input wave for generating a first signal in the form of a plurality of pulses, said pulses having a first average repetition rate substantially proportional to the average frequency value of the said input wave and undergoing variations of the first repetition rate substantially proportional to deviations of the frequency of said input wave about the said average value, said signal-generating means comprising a capacitor and a first resistance element connected in series circuit arrangement and means for applying a charging potential of given value to the said series circuit, the said resistance-capacitance circuit having a time constant of given value, and means responsive to the said input wave for discharging the said capacitor at a repetition rate proportional to the said instantaneous frequency value of the said input wave, means coupled to the said capacitor and operative at a given amplitude of the said first signal for deriving from the said first signal a second signal in the form of a plurality of pulses having a second average repetition rate and a second average duration substantially proportional to the said first average repetition rate and undergoing variations of the second repetition rate and of the second duration substantially proportional to the said variations of the said first repetition rate, each of the pulses of the said second signal having a duration determined by the said time constant of the said resistance-capacitance circuit, by the said given amplitude and by the said given value of the said charging potential, means for deriving from the said second signal a third signal in the form of a plurality of pulses having a third average repetition rate and a third average duration substantially proportional to the said second average repetition rate and undergoing variations of the third repetition rate and of the third duration substantially proportional to the said variations of the second repetition rate and of the second duration, means for varying the amplitude of the pulses of the said third signal comprising second and third resistance elements connected in series circuit arrangement, means for applying a potential to the latter series circuit, means for coupling the junction of the said second and third resistance elements to the said third signal-deriving means, averaging means coupled to the said third signal-deriving means for producing an output wave having a reference level component of given amplitude as determined by the said third average repetition rate and by the said amplitude and the said third average duration of the pulses of the said third signal and having amplitude variations about the said reference level as determined by the said third variations of the pulse repetition rate and by the said amplitude and duration of each of the said third signal pulses, and means for modifying the extent of the said amplitude variations of the said output wave about the said reference level independently of the said amplitude of the said reference level, said latter means comprising means for varying the value of the said first resistance element by a given amount and in a given sense and for simultaneously varying the value of the said second resistance element by the said given amount and in a sense opposite to the said given sense, the said first, second and third resistance elements and the said capacitor having values at which the area of each pulse of the said third signal as defined by the said amplitude value and duration thereof at a given repetition rate remains substantially constant upon variations of the said first and second resistance elements.

8. An electrical system according to claim 7 wherein the said means for deriving the said second signal comprises means coupled to the said capacitor for limiting the charging potential of the said capacitor to a value smaller than the said given value of the said charging potential.

9. A receiving system comprising means responsive to a frequency-modulated wave for generating a first signal in the form of a plurality of pulses, the said pulses having a first average repetition rate substantially proportional to the nominal frequency value of the said frequency-modulated wave and undergoing first variations of the first repetition rate substantially proportional to the frequency deviations of the said frequency-modulated wave, means coupled to the said generating means for producing a second signal in the form of a plurality of pulses, said pulses having a second average repetition rate and an average duration substantially proportional to the said first average repetition rate of the said first signal and undergoing variations of the second repetition rate and of the duration substantially proportional to the said first variations, the said pulses of the said second signal each having an area defined by the amplitude and duration thereof, means coupled to the said second signal-generating means for producing an output wave having a reference level component at an amplitude determined by the said second average pulse repetition rate and by the average area of the said second pulses and having amplitude variations about the said reference level as determined by the amplitude of said second pulses and by the said second variations of the said second pulse repetition rate and by the variations of the duration of the said second pulses, means for varying the amplitude of the said second pulses thereby to vary the amplitude of the variations of the said output wave, and means for varying the duration of the said pulses in a manner inverse to the said variation of the amplitude of the said second pulses thereby to maintain the average area of the said pulses and the amplitude of the said reference level component at substantially constant values.

10. A receiving system according to claim 9 wherein the said first and second average pulse repetition rates are each substantially equal to the said nominal frequency value of the said frequency-modulated wave, wherein the said first and second variations of the repetition rates of the said first and second signals respectively are each substantially equal to the said frequency deviations of the said frequency-modulated wave, and wherein the said means for varying the said amplitude and the said duration of the pulses of the said second signal comprise means for varying both of the said parameters simultaneously.

11. A receiving system according to claim 9 wherein the said means for generating the said second signal comprises a capacitor and a first resistance element connected in series circuit arrangement, second and third resistance elements connected in series circuit arrangement, the said series circuits being connected in parallel, and means for applying a source of positive potential to the said circuits, and wherein the said means for varying the said amplitude and duration of the pulses of the said second signal comprise means adapted to produce an output signal having an amplitude proportional to a potential applied thereto, means for varying the value of the said first resistance element by a given amount and in a given sense and for simultaneously varying the value of the said second resistance element by the said given amount and in a sense opposite to the said given sense, and means for coupling the said output signal-producing means to the interconnection of the said second and third resistance elements.

12. A receiving system according to claim 11 wherein the said means responsive to the said frequency-modulated wave for generating the said first signal comprises means for deriving from the said frequency-modulated wave a third signal in the form of a plurality of substantially rectangular pulses and for differentiating the said third signal, the said third signal having a third instantaneous pulse, repetition rate substantially proportional to the instantaneous frequency value of the said frequency-modulated wave, and wherein the said second signal-producing means comprises means for discharging the said capacitor at a rate substantially proportional to the said third instantaneous pulse repetition rate.

13. In a sonobuoy receiving system, a source of a frequency-modulated wave having a predetermined nominal frequency value and having an instantaneous frequency value as determined by frequency deviations of the said frequency-modulated wave from the said nominal frequency value, comprising means responsive to the said frequency-modulated wave for generating a first signal comprising a plurality of substantially rectangular pulses and for differentiating the said first signal thereby to produce a second signal in the form of a plurality of impulses, the said first signal having a first average pulse repetition rate substantially equal to the said nominal frequency value of the said frequency-modulated wave and undergoing first variations of the pulse repetition rate about the said first average repetition rate substantially equal to the said frequency deviations of the said frequency-modulated wave and the said second signal having a second average pulse repetition rate substantially equal to the said first average repetition rate and undergoing second variations of the pulse repetition rate about the said second average repetition rate substantially equal to the said first variations, means coupled to the said generating and differentiating means for producing a third signal in the form of a plurality of pulses having a third average pulse repetition rate substantially equal to the said second average pulse repetition rate and undergoing third variations of the pulse repetition rate substantially equal to the said second variations, said means comprising a capacitor and a first resistance element connected in series circuit arrangement and means for applying a charging potential of given value to the said series circuit, said resistance-capacitance circuit having a time constant of given value, means coupled to the said capacitor for limiting the charging potential of the said capacitor to a value smaller than the said given value of the said charging potential and means responsive to the said second signal for discharging the said capacitor at a repetition rate substantially equal to the instantaneous pulse repetition rate of the said second signal, means for deriving from the said third signal a fourth signal in the form of a plurality of pulses having a fourth average pulse repetition rate substantially equal to the said third average pulse repetition rate and undergoing fourth variations about the said fourth average pulse repetition rate substantially equal to the said third variations, the said pulses of the said fourth signal having a duration determined by the said time constant of the said resistance-capacitance network, by the said potential value established by the said limiting means and by the said given value of the said charging potential, means for deriving from the said fourth signal a fifth signal in the form of a plurality of pulses having a fifth average pulse repetition rate substantially equal to the said fourth average pulse repetition rate and undergoing fifth variations of the pulse repetition rate about the said fifth average pulse repetition rate substantially equal to the said fourth variations, means for varying the amplitude of the pulses of the said fifth signal comprising second and third resistance element connected in series circuit arrangement, means for applying the said positive potential of given value to the latter series circuit, means for coupling the junction of the said second and third resistance elements to the said deriving means for the said fifth signal, averaging means coupled to the said fifth signal-deriving means for producing an output wave having a reference level of given amplitude proportional to the said fifth average pulse repetition rate and further determined by the amplitude and the average duration of the pulses of the said fifth signal and having amplitude variations about the said reference level proportional to the said fifth variations and further determined by the said amplitude and duration of the said pulses of the said fifth signal, and means for modifying the extent of the said amplitude variations of the said output wave comprising means for varying the value of the said first resistance element by a given amount and in a given sense and for simultaneously varying the value of the said second resistance element by the said given amount and in a sense opposite to the said given sense, the said first, second and third resistance elements and the said capacitor having values at which the said amplitude and duration of each of the pulses of the said fifth signal are varied in a substantially inverse manner in response to variations of the values of the said first and second resistance elements and the area of each of the latter pulses as defined by the said amplitude and duration thereof is maintained substantially constant for a given pulse repetition rate thereof.

14. In a sonobuoy receiving system, a source of a frequency-modulated wave having a predetermined nominal frequency value and having an instantaneous frequency value as determined by frequency deviations of the said frequency-modulated wave from the said nominal frequency value, means coupled to the said source and responsive to the said frequency-modulated wave for generating a first signal comprising a plurality of substantially rectangular pulses and for differentiating the said first signal thereby to produce a second signal in the form of a plurality of impulses, the said first and second signals each having an instantaneous pulse repetition rate substantially equal to the said instantaneous frequency value of the said frequency-modulated wave, a series-connected network comprising a first capacitor, a first resistance element having a variable tap defining first and second portions, and a second resistance element, means for coupling the said first capacitor and the said second resistance element to a point at reference potential, means for applying a positive potential of given value to the said variable tap, means for discharging the said first capacitor at a repetition rate substantially equal to the said instantaneous pulse repetition rate, the latter means comprising a first electron discharge tube having a cathode, a control electrode and an anode, means for coupling the said cathode to a point at reference potential, means for coupling the said control electrode to the said second signal-producing means, means for coupling the said anode to the interconnection of the said first capacitor and first resistance element, means for limiting the charging potential of the said first capacitor to a value smaller than the given value of the said positive potential, the latter means comprising a second electron discharge tube having a cathode, a control electrode and an anode, means for applying to the latter cathode a positive potential having substantially the said smaller value, means for coupling the latter control electrode to the said interconnection of the said first capacitor and first resistance element, a first resistor for applying the said positive potential of given value to the said anode of the said second electron discharge tube, whereby there is generated at the latter anode a third signal in the form of a plurality of rectangular pulses having the said instantaneous pulse repetition rate, each pulse thereof having a duration as determined by the time constant of the said first portion of the said first resistance element and the said capacitor, the given value of the said positive potential, and the said smaller potential value, means for varying the amplitude of the last-named rectangular pulses comprising a third electron discharge tube having a cathode, a control electrode and an anode, means for coupling the last-named cathode to a point at reference potential, a second resistor for applying to the last-named control electrode the said positive potential of given value, a second capacitor for coupling the last-named control electrode to the said anode of the said second electron discharge tube, a third resistor for coupling the said anode of the said third electron discharge tube to the interconnection of the said first and second resistance elements, whereby there is generated at the last-named anode a fourth signal in the form of a plurality of rectangular pulses having substantially the said instantaneous pulse repetition rate, each pulse having a fourth amplitude, a fourth duration substantially equal to the said duration of the said third-signal pulses and an area defined by the said fourth amplitude and duration, the said first capacitor, first and second resistance elements having values maintaining the said area substantially constant for a given pulse repetition rate when the position of the said variable tap upon the said first resistance element is varied, and output means comprising a low-pass filter coupled to the said anode of the said third electron discharge tube.

References Cited in the file of this patent

UNITED STATES PATENTS

| 2,476,301 | Jenks | July 19, 1949 |
| 2,631,270 | Goble | Mar. 10, 1953 |